US008710949B2

(12) United States Patent
Ledendecker

(10) Patent No.: US 8,710,949 B2
(45) Date of Patent: Apr. 29, 2014

(54) REMOTE IGNITION SYSTEM FOR A VEHICLE AND METHOD FOR SECURING A REMOTE IGNITION FUNCTION

(75) Inventor: Ingo Ledendecker, Buxheim (DE)

(73) Assignee: Augi AG, Ingolstadt (DE)

( * ) Notice: Subject to any disclaimer, the term of this patent is extended or adjusted under 35 U.S.C. 154(b) by 548 days.

(21) Appl. No.: 13/060,094

(22) PCT Filed: Jul. 24, 2009

(86) PCT No.: PCT/EP2009/005382
§ 371 (c)(1),
(2), (4) Date: Feb. 22, 2011

(87) PCT Pub. No.: WO2010/020330
PCT Pub. Date: Feb. 25, 2010

(65) Prior Publication Data
US 2011/0148566 A1    Jun. 23, 2011

(30) Foreign Application Priority Data
Aug. 22, 2008 (DE) .......................... 10 2008 039 303

(51) Int. Cl.
*G05B 23/02* (2006.01)

(52) U.S. Cl.
USPC ............................. 340/3.1; 340/5.72; 340/5.64

(58) Field of Classification Search
USPC .................. 340/3.1, 5.72, 5.64; 180/65.1
See application file for complete search history.

(56) References Cited

U.S. PATENT DOCUMENTS

| | | | | |
|---|---|---|---|---|
| 2,544,955 A | * | 3/1951 | Harrelson | 290/37 R |
| 3,553,472 A | * | 1/1971 | Arlandson et al. | 290/38 R |
| 4,131,304 A | * | 12/1978 | Wagner | 290/38 C |
| 4,139,801 A | * | 2/1979 | Linares | 315/83 |
| 4,227,588 A | * | 10/1980 | Biancardi | 180/167 |

(Continued)

FOREIGN PATENT DOCUMENTS

| | | |
|---|---|---|
| JP | 5-21172 | 3/1993 |
| JP | 11-78789 | 3/1999 |
| JP | 2006-9650 | 1/2006 |
| JP | 2006-248471 | 9/2006 |

*Primary Examiner* — Jennifer Mehmood
*Assistant Examiner* — Rufus Point
(74) *Attorney, Agent, or Firm* — Staas & Halsey LLP

(57) ABSTRACT

The invention relates to a remote ignition system for a vehicle with a remote ignition control device for activating a remote ignition by providing a release signal, means for detecting a driver's intention to start driving, and an engine control device which comprises the following: a first evaluation unit for evaluating a signal which has been received from the remote ignition control device, a unit coupled to the first evaluation unit for starting of the engine in response to a release signal and for stopping the engine in response to a blocking signal, and a second evaluation unit for evaluating signals which have been received from the means for detecting the intention to start driving. The engine control device furthermore comprises a storage unit for storing the last signal evaluated by the first evaluation unit, and a test unit which is coupled to the second evaluation unit, to the storage unit, and to the unit for starting and stopping the engine and which is designed to read out the signal stored in the storage unit when the second evaluation unit has ascertained the intention to start driving and, if it is a release signal, to send a blocking signal to the unit for starting and stopping the engine and to modify the contents of the storage unit. The invention furthermore relates to a method for securing a remote ignition function.

18 Claims, 1 Drawing Sheet

(56) References Cited

U.S. PATENT DOCUMENTS

| | | | |
|---|---|---|---|
| 5,936,316 A * | 8/1999 | Jurkiewicz et al. | 307/10.6 |
| 5,942,988 A * | 8/1999 | Snyder et al. | 340/12.22 |
| 6,028,372 A * | 2/2000 | West et al. | 307/10.6 |
| 6,116,201 A * | 9/2000 | LaBelle | 123/179.2 |
| 6,297,731 B1 * | 10/2001 | Flick | 340/426.16 |
| 6,628,196 B1 * | 9/2003 | Flick | 340/426.13 |
| 7,151,325 B2 * | 12/2006 | Matsubara et al. | 307/10.6 |
| 7,167,780 B2 * | 1/2007 | Hattori | 701/2 |
| 7,280,908 B2 * | 10/2007 | Maehara et al. | 701/113 |
| 7,620,486 B2 * | 11/2009 | Ward et al. | 701/51 |
| 7,688,178 B2 * | 3/2010 | Koike et al. | 340/5.64 |
| 7,853,367 B2 * | 12/2010 | Higashi | 701/2 |
| 7,859,129 B2 * | 12/2010 | Ozawa et al. | 307/10.2 |
| 7,916,004 B2 * | 3/2011 | Mackjust | 340/426.13 |
| 8,102,249 B2 * | 1/2012 | Sakamoto et al. | 340/426.11 |
| 2002/0109583 A1 * | 8/2002 | Losey | 340/5.72 |
| 2003/0030549 A1 * | 2/2003 | Flick | 340/426 |
| 2003/0058083 A1 * | 3/2003 | Birchfield | 340/5.22 |
| 2003/0214392 A1 * | 11/2003 | Flick | 340/426.13 |
| 2004/0262068 A1 * | 12/2004 | Matsubara et al. | 180/287 |
| 2006/0087405 A1 * | 4/2006 | Koike et al. | 340/5.64 |
| 2006/0255911 A1 * | 11/2006 | Taki et al. | 340/5.72 |
| 2008/0117079 A1 * | 5/2008 | Hassan | 340/901 |
| 2012/0268259 A1 * | 10/2012 | Igel et al. | 340/426.11 |

* cited by examiner

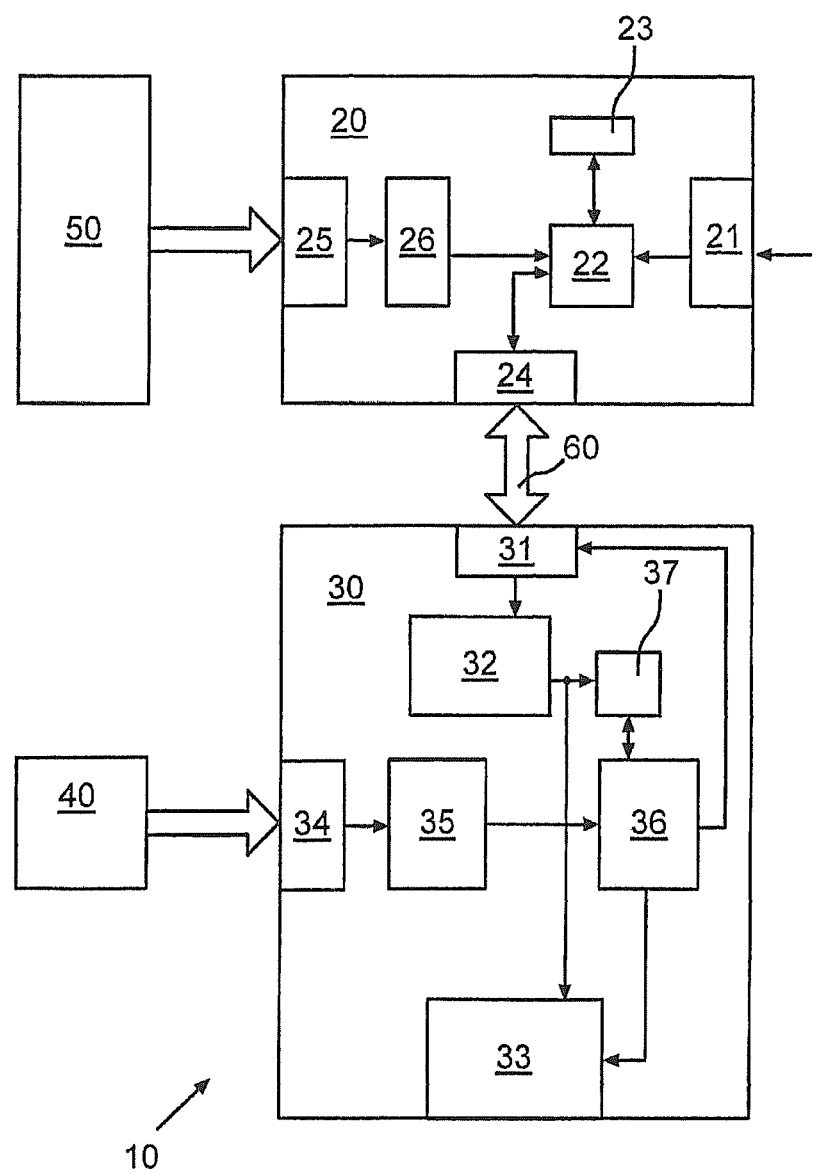

REMOTE IGNITION SYSTEM FOR A VEHICLE AND METHOD FOR SECURING A REMOTE IGNITION FUNCTION

The present invention relates to a remote ignition system for a vehicle with a remote ignition control device for activating a remote ignition by providing a release signal, means for detecting the intention of a driver to start driving, and an engine control device with a first evaluation unit for evaluating a signal which has been received from the remote ignition control device, a unit coupled to the first evaluation unit for starting the engine in response to a release signal and for stopping the engine in response to a blocking signal, and a second evaluation unit for evaluating signals which have been received from the means for detecting the intention to start driving. The invention furthermore relates to a method for securing a remote ignition function.

BACKGROUND OF THE INVENTION

To enhance driver comfort, systems have been developed by means of which a vehicle can be cooled or heated by the climate control system prior to driving off by the engine being started by remote control. In this case, the driver is not in the vehicle, which remains locked. So that there can be no unauthorized use, for safety reasons the engine is turned off when a vehicle door is opened. Typically, the door contact of the driver's door is used as the signal. Such a system is disclosed, for example, in U.S. Pat. No. 4,227,588.

If the door contact fails, however, the engine remains on, and unauthorized individuals could simply drive off. It is also conceivable to manipulate the corresponding signal in order to very easily defeat the immobilizer of the vehicle.

Therefore, the object of this invention is to devise a remote ignition system and a method for securing a remote ignition function which guarantee increased security.

SUMMARY OF THE INVENTION

The present invention is based on the finding that, when a vehicle is to be set into motion, in this process signals are involved which are necessary for operation of the engine and which therefore cannot be manipulated. If these signals were in fact to be manipulated or even to fail completely, the engine cannot run. If these signals, which transmit the intention to start driving to the engine control device, are used as triggers for the engine to shut down directly after a remote ignition, the security for a remote ignition can be increased. For this purpose, the engine control device of a vehicle furthermore comprises a storage unit for storing the last signal evaluated by the first evaluation unit and a test unit, which is coupled to the second evaluation unit, to the storage unit, and to the unit for starting and stopping the engine; this test unit is designed to read out the signal stored in the storage unit when the second evaluation unit has ascertained the intention to start driving, and if it is a release signal, to send a blocking signal to the unit for starting and stopping the engine and to modify the contents of the storage unit.

According to one preferred configuration of the invention, the means for detecting the intention to start driving comprise a pedal value sensor of an electronic gas pedal. As soon as a change of the pedal value sensor is ascertained, the engine shuts off if it has been started by means of remote ignition. The input of the pedal value sensor of the electronic gas pedal represents a reliable signal since it cannot be manipulated. If the signal of the pedal value sensor fails or is manipulated, the vehicle cannot be driven since gas cannot be delivered. The evaluating control device of the pedal value sensor is directly the engine control device itself. This means a high level of protection against unauthorized use.

According to another preferred configuration of the invention, the means for detecting the intention to start driving comprise a sensor for detecting the engine speed, which likewise has the advantage that it cannot be manipulated. The sensor can be a rotational speed sensor or a top dead center detector (TDC detector).

According to another preferred configuration of the invention, the means for detecting the intention to start driving are designed to ascertain a torque demand or torque change on the engine. In this case, the means for detecting the intention to start driving can reside directly in the engine control device and can be designed to recognize a sudden increase of torque which is necessarily initiated by starting off without giving the engine gas.

According to one preferred embodiment of the invention, the remote ignition system furthermore comprises means for detecting the occurrence of at least one of the following conditions: a) unlocking of the vehicle, b) opening of at least one vehicle door, and c) presence of an individual in the vehicle. Preferably, the means for detecting the occurrence of at least one of these conditions comprise at least one of the following groups: a contact switch of a door lock cylinder of a vehicle door; a central vehicle locking system; a door contact switch of a vehicle door, especially the driver-side door; a door handle sensor; a seat occupancy recognition unit; and an interior sensor of an antitheft alarm system. Unlocking of the vehicle can be ascertained by means of the contact switch of the door lock cylinder of a vehicle door or, if present, the central locking system of the vehicle. Opening of at least one vehicle door can be ascertained by the door contact switch of one vehicle door or the door handle sensor, while the presence of an individual in the vehicle can be detected by a seat occupancy detection unit or an interior sensor of an antitheft alarm system. If these means are used to cause the engine to shut down after remote ignition, the means for detecting the intention to start driving will take effect only when the means for detecting the occurrence of conditions a) to c) fail.

According to one especially preferred embodiment of the invention, the test unit of the engine control device is coupled to the means for detecting the occurrence of at least one of conditions a) to c) and is designed to likewise read out the signal stored in the storage unit when the occurrence of at least one of conditions a) to c) is ascertained and, if it is a release signal, to send a blocking signal to the unit for starting and stopping the engine, and to modify the contents of the storage unit. In this case, the means for detecting the occurrence of at least one of conditions a) through c) automatically report the occurrence of the corresponding condition to the engine control device.

According to one alternative, especially preferred embodiment of the invention, the remote ignition control device is coupled to the means for detecting the occurrence of conditions a) to c) and is designed to provide a blocking signal if there is remote ignition when the occurrence of at least one of conditions a), b), or c) is ascertained. In this case, the remote ignition control device evaluates the signals provided by the means for detecting the occurrence of conditions a) to c) and causes the engine to stop by the engine control device when a remote ignition is present by providing a blocking signal.

Preferably, the remote ignition control device is designed to activate a remote ignition in response to a signal from a remote control. In addition or alternatively, the remote ignition control device is designed to activate a remote ignition at a preset time. Thus a vehicle user can establish beforehand when the engine is to be started by setting a timer.

According to one preferred configuration of the invention, the remote ignition control device and the engine control device are connected via a CAN bus.

The advantages and preferred embodiments presented in conjunction with the system according to the invention apply accordingly to the device according to the invention.

The invention is described below using the attached drawing, which constitutes one preferred exemplary embodiment.

BRIEF DESCRIPTION OF THE DRAWING

FIG. 1 shows a schematic of one embodiment of the system according to the invention.

DETAILED DESCRIPTION OF THE PREFERRED EMBODIMENTS OF THE INVENTION

FIG. 1 shows a remote ignition system 10 for a vehicle with a remote ignition control device 20 for activating a remote ignition, an engine control device 30, means 40 for detecting the intention of a driver to start driving, and means 50 for detecting the occurrence of at least one of the following conditions: unlocking of the vehicle, opening of at least one vehicle door, and the presence of an individual in the vehicle. The remote ignition control device 20 and engine control device 10 are connected via a CAN bus.

According to the preferred exemplary embodiment, the remote ignition control device 20 comprises a receiver 21 for receiving a signal for activating a remote ignition. This signal is sent from a user, for example, by means of a remote control to the vehicle in order to start the vehicle remotely and, depending on the weather, to enable cooling or heating of the vehicle before the user gets into the vehicle. In addition or alternatively, it can also be provided that the user can preset a time at which the remote ignition control device 20 then activates a remote ignition. The remote ignition control device 20 furthermore comprises an input 25 for receiving a signal from the means 50 for detecting the occurrence of a certain condition and an evaluation unit 26 which is connected to the input 25 for evaluating a signal which has been received from the means 50 for detecting the occurrence of a certain condition. The means for detecting the occurrence of a certain condition can be a contact switch of a door lock cylinder of one or more vehicle doors; a door contact switch of one or more vehicle doors, preferably the driver-side door; a door handle sensor which detects either pulling on the door handle or a hand reaching for the door handle; or recognition of a seat being occupied. There can also be a combination of several of these means. In addition or alternatively, the means 50 can also comprise a central locking system. In this case, not only are signals received from the central locking system, but signals can also be sent from the remote ignition control device 20 via the interface 25 to the central locking system. The remote ignition control device 20 furthermore comprises an input/output 24 for receiving signals from and for sending signals to the engine control device 30. Alternatively to the exemplary embodiment shown in FIG. 1, the remote ignition control device 20 can also comprise only one input/output, which is used as an interface between the remote ignition control device 20 and both the engine control device 30 and also the means 50 for detecting the occurrence of a specific condition. Moreover, the remote ignition control device 20 comprises a central unit 22, which is coupled to the receiver 21, the input/output 24, and the evaluation unit 26 for activating a remote ignition by transmitting a release signal to the input/output 24 in response to an activation acquired from the receiver 21. Finally, the remote ignition control device 20 comprises another storage unit 23 coupled to the central unit 22 for storing a signal which indicates a remote ignition. It is also conceivable for the components of the remote ignition control device to be contained in another control device.

According to the preferred exemplary embodiment, the engine control device 30 comprises an input/output 31 for receiving signals from and for sending signals to the remote ignition control device 20 and a first evaluation unit 32 coupled to the input/output 31 for evaluating signals received from the remote ignition control device 20. The engine control device 30 furthermore comprises a unit 33 coupled to the first evaluation unit 32 for engine ignition in response to a release signal and for stopping the engine in response to a blocking signal. Furthermore, the engine control device 30 comprises an input 34 for receiving a signal from the means 40 for detecting the driver's intention to start driving and a second evaluation unit 35 coupled to the input 34 for evaluating signals received from the means 40 for detecting the intention to start driving. Alternatively to the exemplary embodiment shown in FIG. 1, the engine control device 30 can also comprise only one input/output, which is used as an interface between the engine control device 30 and not only the remote ignition control device 20, but also the means 40 for detecting the driver's intention to start driving. In the engine control device 30, there is furthermore a test unit 36 which is coupled to the second evaluation unit 35, to the unit 33 for starting and stopping the engine, and to the input/output 31 in order to induce stopping of the engine by sending a blocking signal to the unit 33 for starting and stopping the engine when the second evaluation unit 35 ascertains the intention to start driving and there is remote ignition, and to provide a signal at the input/output 31 which signals that the engine has been shut off. In order to ascertain whether there is a remote ignition, the engine control device 30 finally also comprises another storage unit 37, which is coupled to the evaluation unit 32, and the test unit 36 for storing the last signal evaluated by the first evaluation unit 32. If it is a release signal, there is remote ignition.

The means 40 for detecting the driver's intention to start driving is preferably a pedal value sensor of an electronic gas pedal which, in any case, is directly connected to the engine control device as its evaluating control device. The vehicle cannot be driven in the event of a failure or manipulation of the pedal value sensor signal since gas cannot be delivered. This ensures high security of the remote ignition system 10. Alternatively to the pedal value sensor, a speed sensor for detecting an engine speed can also be used to signal the intention to start driving, which likewise offers the advantage of not being able to be manipulated. The third alternative for signaling an intention to start driving could be additional software, preferably right in the engine control device 30, which recognizes a sudden torque increase which is necessarily triggered by starting off without delivering gas.

How the preferred exemplary embodiment of the remote ignition system 10 according to the invention works will be explained below. When an activation signal is received by the receiver 21 or when a time which has been preset by the user is reached, the remote ignition control device 20 first checks whether the prerequisites under which a remote ignition can be carried out have been met. These prerequisites may include the doors of the vehicle being locked. For this purpose, for example, signals from contact switches of the vehicle door lock cylinders are evaluated. Alternatively, a signal from the central locking system of the vehicle can be evaluated. In this case, it can also be provided that when it is ascertained that the vehicle is not locked, the remote ignition control device 20 for a remote ignition will send a signal to the central locking system for locking the vehicle. It can also be additionally provided for a check to be made prior to a remote ignition whether a gear has been engaged. Then a remote ignition is carried out only when this is not the case. If the established prerequisites for a remote ignition are met, the presence of a remote ignition is stored in a storage unit 23, and a release signal is provided at the input/output. If the engine control device 30 at its input/output 31 receives a signal from the remote ignition control device 20, it is evaluated in the first evaluation unit 32 and stored in the storage unit 37 as well as being transmitted to the unit 33 for starting and stopping the engine. If it is a release signal, the unit 33 starts the engine.

To prevent unauthorized users from driving off with the vehicle, it is intended that the engine be turned off again when someone enters the vehicle. For this purpose, on the one hand, the means 50 check whether the vehicle is unlocked; at least one vehicle door is opened; or, for example, by means of a seat occupancy recognition unit, someone is present in the vehicle. As soon as a corresponding signal is received and evaluated by the remote ignition control device 20 from the means 50 for detecting the occurrence of at least one of these conditions, a check is made by reading out the storage unit 23 to determine whether there is remote ignition, and, if this is the case, a blocking signal is provided at the input/output 24. This signal is received from the engine control device 30 and evaluated. If the engine control device 30 recognizes that it is a blocking signal, it shuts off the engine.

In addition, according to the invention, when the signal of the intention to start driving is received at the input 34 of the engine control device 30, a check is made by reading out the memory unit 37 to determine whether there is remote ignition, and, if this is the case, a blocking signal is sent by the test unit 36 to the unit 33 for starting and stopping an engine. In this case, the test unit 36 moreover provides a signal in order to report shutoff of the engine to the remote ignition control device 20 or other control devices in the vehicle. The blocking signal from the remote ignition control device 20 and the blocking signal from the test unit 36 lead as an OR condition to the immediate shutting off of the engine. Thus it is ensured that if the means 50 for detecting the occurrence of a certain condition fail or the signals sent from these means are manipulated, after a remote ignition the engine will nevertheless be shut off as soon as anyone tries to start driving. Preferably, the signal of a pedal value sensor 40 which is read in directly from the engine control device 30 is used to ascertain an intention to start driving, where a change of the pedal value sensor signals that gas is being delivered.

Alternatively to the above described exemplary embodiment in which the remote ignition control device 20 sends a blocking signal to the engine control device 30 when at least one of the conditions a) to c) occurs, it can also be provided that the means 50 for detecting the occurrence of at least one of the conditions a) to c) report the occurrence of the corresponding condition directly to the engine control device 30. In this exemplary embodiment, the blocking signal is then transmitted from the evaluation unit 35 to the test unit 36 of the engine control device 30 instead of being provided from the remote ignition control device 20.

The invention claimed is:

1. A remote ignition system for a vehicle with
    a remote ignition control device
    for receiving a signal for activating a remote ignition,
    for checking of at least one remote ignition prerequisite which comprises the locking of the doors,
    for locking the doors when the signal for activating a remote ignition has been received and the doors are not locked, and
    for providing a release signal when the doors are locked;
    means for detecting the intention of a driver to start driving; and
    an engine control device, which comprises the following:
      i. a first evaluation unit for evaluating a signal which has been received from the remote ignition control device;
      ii. a unit coupled to the first evaluation unit for starting the engine in response to a release signal and for stopping the engine in response to a blocking signal; and
      iii. a second evaluation unit for evaluating signals which have been received from the means for detecting the intention to start driving;
    the engine control device furthermore comprises a storage unit for storing the last signal evaluated by the first evaluation unit, and a test unit which is coupled to the second evaluation unit, to the storage unit, and to the unit for starting and stopping the engine and which is designed to read out the signal stored in the storage unit when the second evaluation unit has ascertained the intention to start driving and, upon a release signal from the storage unit, to send a blocking signal to the unit for starting and stopping the engine and to modify the contents of the storage unit.

2. The remote ignition system according to claim 1, wherein the means for detecting the intention to start driving comprise a pedal value sensor of an electronic gas pedal.

3. The remote ignition system according to claim 1, wherein the means for detecting the intention to start driving comprise a sensor for detecting engine speed.

4. The remote ignition system according to claim 1 wherein the means for detecting the intention to start driving are designed to ascertain a torque demand on the engine.

5. The remote ignition system according to claim 1 wherein the system furthermore comprises means for detecting the occurrence of at least one of the following conditions:
    a) unlocking of the vehicle;
    b) opening of at least one vehicle door; and
    c) presence of an individual in the vehicle.

6. The remote ignition system according to claim 5 wherein, the means for detecting the occurrence of at least one of the conditions a), b), or c) comprise at least one of the following groups:
    a contact switch of a door lock cylinder of one vehicle door; a central vehicle locking system; a door contact switch of a vehicle door; a door handle sensor; a seat occupancy recognition unit; and an interior sensor of an antitheft alarm system.

7. The remote ignition system according to claim 5 wherein, the test unit of the engine control device is coupled to the means for detecting the occurrence of at least one of conditions a), b), or c) and is designed to likewise read out the signal stored in the storage unit when the occurrence of at least one of conditions a), b), or c) is ascertained, and, if it is a release signal, to send a blocking signal to the unit for starting and stopping the engine, and to modify the contents of the storage unit.

8. The remote ignition system according to claim 5, wherein the remote ignition control device is coupled to the means for detecting the occurrence of at least one of conditions a), b), or c) and is designed to provide a blocking signal if there is a remote ignition when the occurrence of at least one of conditions a), b), or c) is ascertained.

9. The remote ignition system according to claim 1, wherein the remote ignition control device is designed to activate a remote ignition in response to a signal from a remote control and/or at a preset time.

10. The remote ignition system according to claim 1, wherein the remote ignition control device and the engine control device are connected via a CAN bus.

11. A method for securing a remote ignition function, characterized by the following steps:
- receiving a signal by a remote ignition control device for activating a remote ignition;
- checking of at least one remote ignition prerequisite by the remote ignition control device, where one of the at least one remote ignition prerequisites involves locking of the doors;
- locking of the doors by a signal of the remote ignition control device when the signal for activating the remote ignition has been received and the doors are not locked;
- providing a release signal by the remote ignition control device for activating a remote ignition when the doors are locked;
- receiving the release signal from the remote ignition control device by an engine control device;
- starting of an engine in response to the received release signal by the engine control device;
- detecting a driver's intention to start driving and providing a driver's intention signal;
- receiving the driver's intention signal by the engine control device;
- evaluating the driver's intention signal by the engine control device;
- shutting off the engine by the engine control device as soon as a driver's intention to start driving is ascertained after a remote ignition.

12. The method for securing a remote ignition function according to claim 11 wherein, the detection of a driver's intention to start driving takes place by means of a pedal value sensor.

13. The method for securing a remote ignition function according to claim 11 wherein, the detection of a driver's intention to start driving takes place by means of a sensor for detecting engine speed.

14. The method for securing a remote ignition function according to claim 11 wherein, the detection of a driver's intention to start driving comprises ascertaining a torque demand on the engine.

15. The method for securing a remote ignition function according to claim 11 including the following additional step:
- shutting off the engine by the engine control device when at least one of the following conditions occurs after a remote ignition:
  a) unlocking of the vehicle;
  b) opening of at least one vehicle door; and
  c) presence of an individual in the vehicle.

16. A system for the remote ignition of a motor vehicle comprising:
- means for detecting a remotely transmitted signal for initiating the ignition of an engine of said vehicle;
- means for detecting at least one condition of said vehicle unsuitable to the remote ignition of said engine;
- means for effecting the suitability of said condition;
- means responsive to said signal and the suitability of said condition for igniting said engine; and
- means responsive to an initiation of said engine prior to ignition by said signal for precluding ignition of said engines by said remote signal,
- wherein said unsuitable condition comprises one of an unlocking of said vehicle, an opening of a vehicle door and the presents of an individual in said vehicle, and
- wherein said means for effecting the suitability of said condition comprises one of means for activating a door lock cylinder and means for activating a central locking system.

17. A system according to claim 16 including means for storing data corresponding to said unsuitable condition, readable to activate said ignition of said engine.

18. A system according to claim 16 wherein said means for precluding ignition of said engine comprises one of actuation of a gas pedal, indication of engine speed and an indication of sudden torque increase.

* * * * *

UNITED STATES PATENT AND TRADEMARK OFFICE
CERTIFICATE OF CORRECTION

PATENT NO. : 8,710,949 B2
APPLICATION NO. : 13/060094
DATED : April 29, 2014
INVENTOR(S) : Ledendecker Page 1 of 1

It is certified that error appears in the above-identified patent and that said Letters Patent is hereby corrected as shown below:

On the Title Page Item [73] (Assignee), Line 1, delete "Augi AG," and insert -- Audi AG, --, therefor.

Signed and Sealed this
Twenty-fourth Day of November, 2015

Michelle K. Lee
*Director of the United States Patent and Trademark Office*